(12) United States Patent
Ursell et al.

(10) Patent No.: US 10,456,944 B2
(45) Date of Patent: Oct. 29, 2019

(54) MULTIFUNCTION CUTTING TOOL GUIDE

(71) Applicants: Michael Ursell, Beverly Hills, MI (US); Garry Favel, Kibbutz Kadarim (IL); Tsvi Hershkovich, Karmiel (IL); Rick Ursell, Rochester Hills, MI (US); Ken Neilson, Troy, MI (US)

(72) Inventors: Michael Ursell, Beverly Hills, MI (US); Garry Favel, Kibbutz Kadarim (IL); Tsvi Hershkovich, Karmiel (IL); Rick Ursell, Rochester Hills, MI (US); Ken Neilson, Troy, MI (US)

(73) Assignee: Affinity Tool Works, LLC, Troy, MI (US)

(*) Notice: Subject to any disclaimer, the term of this patent is extended or adjusted under 35 U.S.C. 154(b) by 338 days.

(21) Appl. No.: 14/334,940

(22) Filed: Jul. 18, 2014

(65) Prior Publication Data

US 2015/0020672 A1    Jan. 22, 2015

Related U.S. Application Data

(60) Provisional application No. 61/847,689, filed on Jul. 18, 2013, provisional application No. 61/900,423, filed on Nov. 6, 2013.

(51) Int. Cl.
*B27B 9/04* (2006.01)
*B23D 59/00* (2006.01)
*B23Q 9/00* (2006.01)
*B23D 45/02* (2006.01)

(52) U.S. Cl.
CPC ............ *B27B 9/04* (2013.01); *B23D 45/027* (2013.01); *B23D 59/00* (2013.01); *B23Q 9/0014* (2013.01); *Y10T 83/8878* (2015.04)

(58) Field of Classification Search
CPC ....... B23D 47/02; B27G 19/04; B23Q 9/0028
USPC ................... 83/574, 828, 743, 745
See application file for complete search history.

(56) References Cited

U.S. PATENT DOCUMENTS

| 2,676,624 | A | * | 4/1954 | Gecmen | B23Q 9/0028 |
| | | | | | 144/136.95 |
| 3,298,407 | A | * | 1/1967 | Scott | B23Q 9/0014 |
| | | | | | 83/489 |
| 4,016,649 | A | * | 4/1977 | Kloster | B23Q 9/0028 |
| | | | | | 30/373 |

(Continued)

FOREIGN PATENT DOCUMENTS

| DE | 29809376 U1 | 9/1998 |
| EP | 1681134 A1 | 7/2006 |

OTHER PUBLICATIONS

International Search Report, 3 Pages dated Nov. 3, 2014.

*Primary Examiner* — Kenneth E Peterson
(74) *Attorney, Agent, or Firm* — William H. Honaker; Dickinson Wright PLLC

(57) ABSTRACT

A multifunction cutting tool guide which includes a base plate having a top surface and a bottom surface, with the base plate top surface including connection points for connecting a power tool to the base plate top surface. A track extends longitudinally along the bottom surface of the base plate for use in guided cuts. The track is defined by first and second spaced walls with at least one of the walls being movable with respect to the other wall to accommodate various sized straight edges. The base also includes a laterally extending channel adapted to mount on a straight edge for rip cuts.

10 Claims, 7 Drawing Sheets

(56) References Cited

U.S. PATENT DOCUMENTS

| | | | | |
|---|---|---|---|---|
| 4,489,634 A * | 12/1984 | Volk | ................... | B23D 47/025 83/468.3 |
| 4,945,799 A * | 8/1990 | Knetzer | ................ | B23Q 9/005 83/471.3 |
| 5,035,061 A * | 7/1991 | Bradbury | ............ | B23Q 9/0028 30/373 |
| 5,103,566 A * | 4/1992 | Stebe | ................ | B23Q 1/4804 30/376 |
| 5,226,345 A * | 7/1993 | Gamble | .............. | B23Q 9/0042 83/574 |
| 5,442,984 A | 8/1995 | Tate | | |
| 5,678,314 A * | 10/1997 | Braunbach | .............. | B23Q 1/60 30/372 |
| 5,921,161 A * | 7/1999 | Newell | ............... | B23Q 9/0078 144/286.1 |
| 6,079,309 A * | 6/2000 | Molburg | ............. | B23Q 9/0078 83/574 |
| 6,591,509 B2 * | 7/2003 | LeBlanc | ............. | B23Q 9/0078 30/374 |
| 6,757,981 B2 * | 7/2004 | Hampton | ................. | B27B 9/04 30/372 |
| 7,043,845 B2 * | 5/2006 | Lukens | .................... | B27B 9/04 30/370 |
| 7,059,225 B1 * | 6/2006 | Rabell | ................. | B23Q 9/0042 83/13 |
| 7,516,552 B2 * | 4/2009 | Yoshida | ................ | B23D 47/02 30/371 |
| 7,905,166 B2 * | 3/2011 | Thomas | ................... | B27B 9/04 30/390 |
| 2003/0221329 A1 | 12/2003 | Gompper et al. | | |
| 2008/0148915 A1 * | 6/2008 | Nickels | .................... | B25F 5/00 83/469 |
| 2008/0264229 A1 * | 10/2008 | Dern | ........................ | B27B 9/04 83/829 |
| 2009/0205211 A1 * | 8/2009 | Nickels, Jr. | .............. | B27B 9/02 30/516 |
| 2014/0026725 A1 * | 1/2014 | Makropoulos | ........... | B27B 9/04 83/13 |
| 2014/0047967 A1 * | 2/2014 | Makropoulos | ....... | B23D 59/007 83/829 |
| 2014/0345436 A1 * | 11/2014 | Behrisch | ............... | B23D 45/16 83/745 |

* cited by examiner

MULTIFUNCTION CUTTING TOOL GUIDE

RELATED APPLICATIONS

This application claims the benefit of U.S. Provisional Application No. 61/847,689 filed on Jul. 18, 2013 and U.S. Provisional Application No. 61/900,423 filed Nov. 6, 2013.

STATEMENT REGARDING FEDERALLY SPONSORED RESEARCH

NONE.

TECHNICAL FIELD

This invention relates generally to power tool guides and more particularly to a versatile multifunctional power tool guide upon which a power tool can be mounted and then used to guide the power tool to cut material along a straight edge and rip material.

BACKGROUND OF THE INVENTION

Power tool guides are well known in the wood working industry. Companies, such as for example, Festool, Kreg, True Trac, and Urekazone sell power tool guides. The main problem with each of these tool guides is that they are dedicated to a specific straight edge and cannot be used on other types of straight edges. If a user doesn't have the straight edge required by the specific guide, the user cannot use the guide. This obviously results in the user being limited to a particular guide and a particular edge. Also, some of these guide are for a single purpose.

Other problems with known systems are more specific to each system. The Festool guide system requires a specific track as discussed above, in addition, the Festool system also requires a dedicated circular saw. Only the Festool saw can be used on the system. The Festool system is also very expensive when compared to other guide systems.

The Kreg system requires a specific track and is limited to a ripping function only. It doesn't have the ability to use the track as a guide for making guided cuts without the use of the edge of the material to act as a guide for the guide track.

The True Trac system is limited to a specific track and has the disadvantage of not being capable of doing rip cuts. Additionally, the True Trac requires a special mount that is difficult to mount to the saw. The mount is also intended to be permanently mounted to the saw. The True Trac is will not allow other tools to be used on the track without attaching a separate mount to the tool.

The Eureka Zone system requires a specific track and is not adapted to be used to cut as a straight edge without the use of the material edge as a guide. It is also large and bulky and not east to set up.

SUMMARY OF THE INVENTION

In general terms, the present invention provides an innovative versatile multifunction saw attachment plate, rail guide and rip attachment that can be used on any straight edge. The present invention solves the problems of known power tool guides and provides a compact, inexpensive, easy to assemble and easy to use solution to guided and rip cutting operations.

The multifunction cutting tool guide of the present invention includes a base plate having a top surface and a bottom surface. The base plate top surface includes connection points for connecting a power tool to the base plate top surface. A track extends longitudinally along the bottom surface of the base plate. The track is defined by first and second spaced walls with at least one of the walls being movable with respect to the other wall.

A power tool can be attached to the base plate and the base plate can be positioned over a straight edge with the straight edge being received within the track of the base plate. The at least one wall is movable against the straight edge with the straight edge engaging the opposite wall. The walls engage both sides of the straight edge such that the base is movable along the straight edge to make a straight cut in a piece of material.

The cutting tool guide system of present invention further includes a channel extending laterally along the bottom surface of the base plate for use in ripping a work piece. The base includes a locking member adapted to lock the base to a rip straight edge. The rip straight edge has a track with a groove extending along the track and a laterally extending rip guide. The channel of the base is positioned over the track and the locking member engages the track to lock the base to the rip straight edge. In the disclosed embodiment, the locking member has a wedge that engages the groove to lock the base plate to the rip straight edge.

The rip straight edge also includes a laterally extending rip guide with a rotatable handle. The rip guide is adapted to engage the edge of the work piece to allow for rip cutting. The handle can be gripped by a user to facilitate rip cutting and can be rotated to avoid the base for cuts of small widths.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
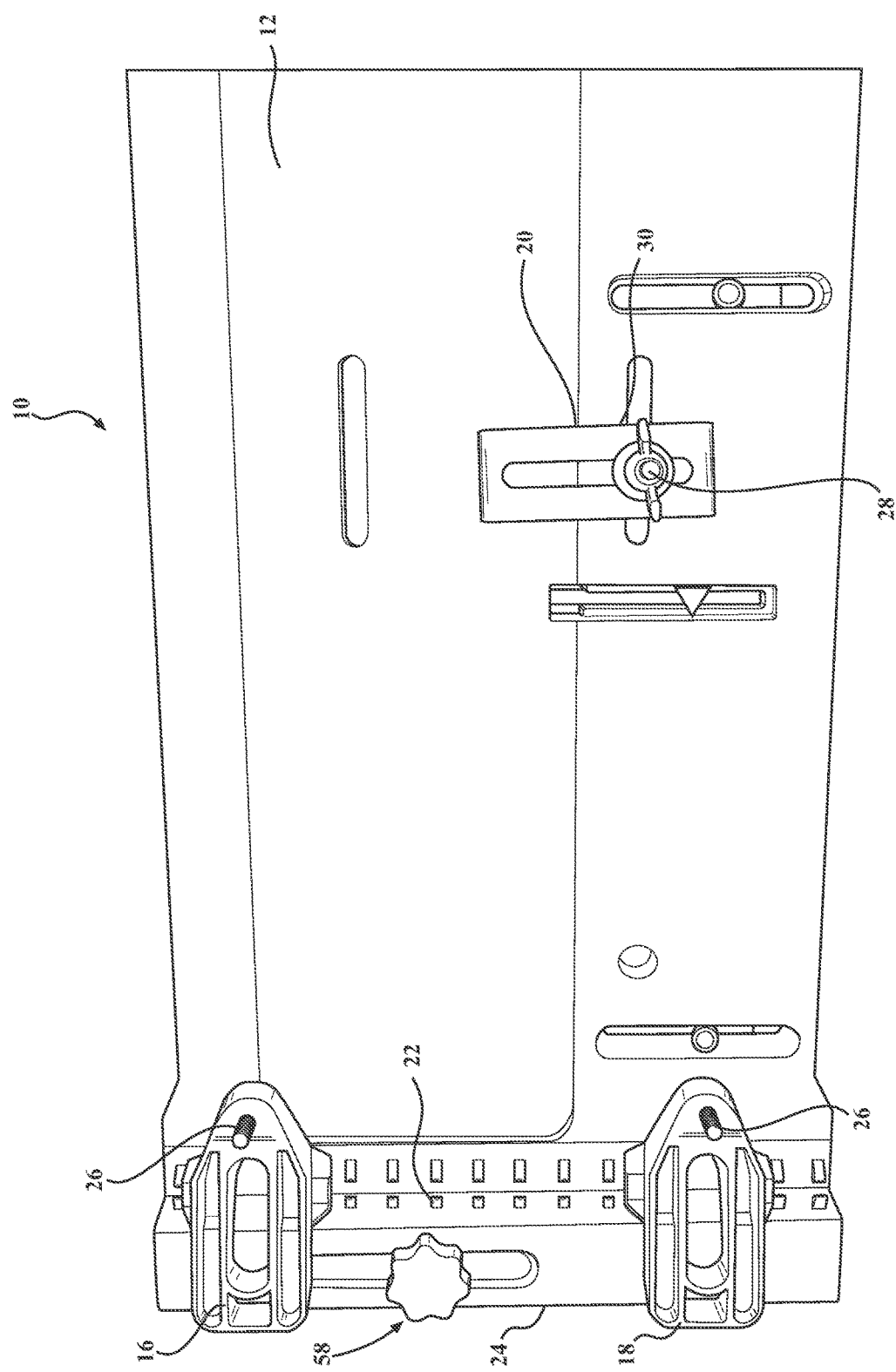
FIG. 1 is a top view of the base plate of the present invention.
Figure 2:
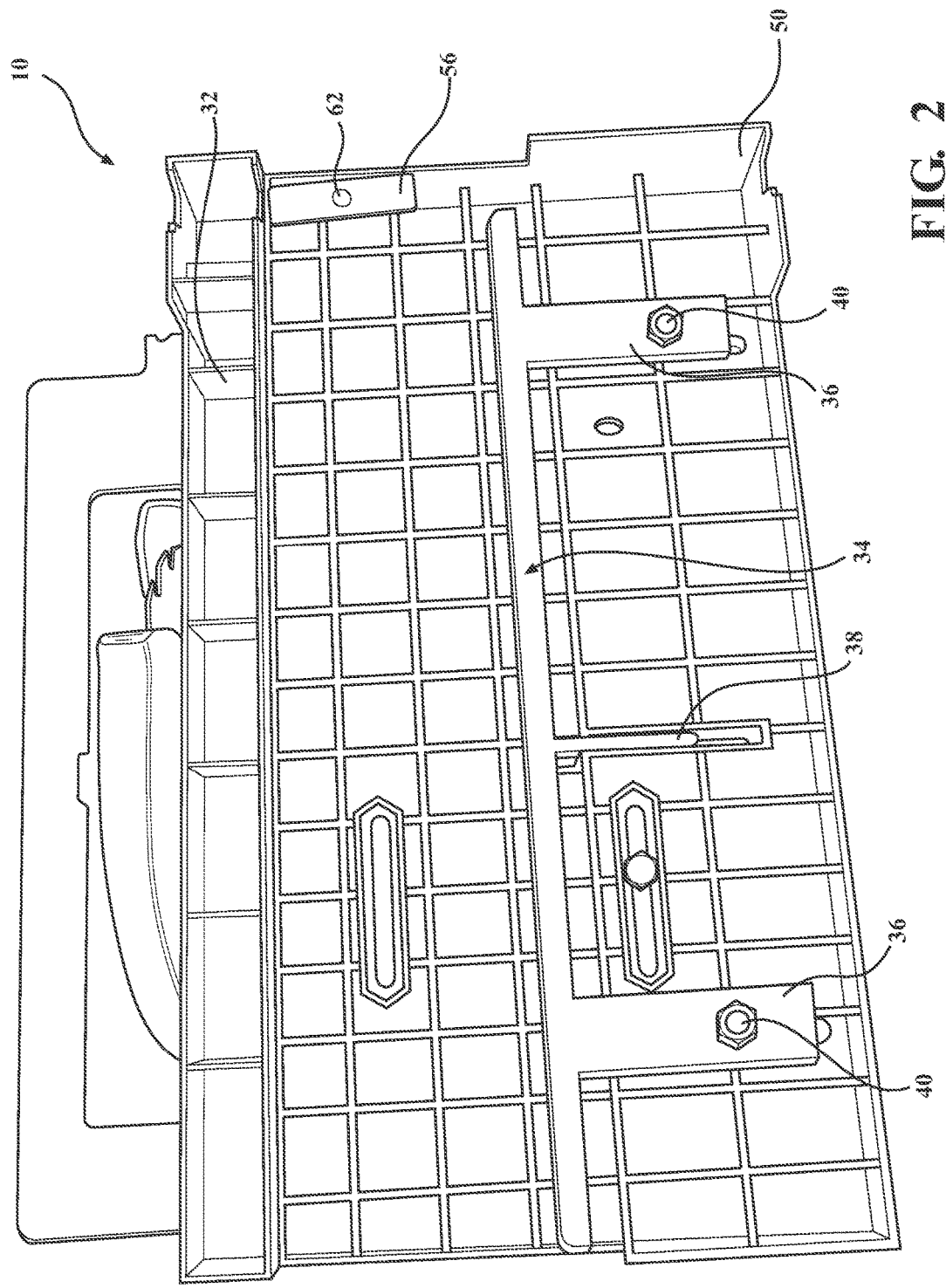
FIG. 2 is a bottom view of the base plate of the present invention.
Figure 3:
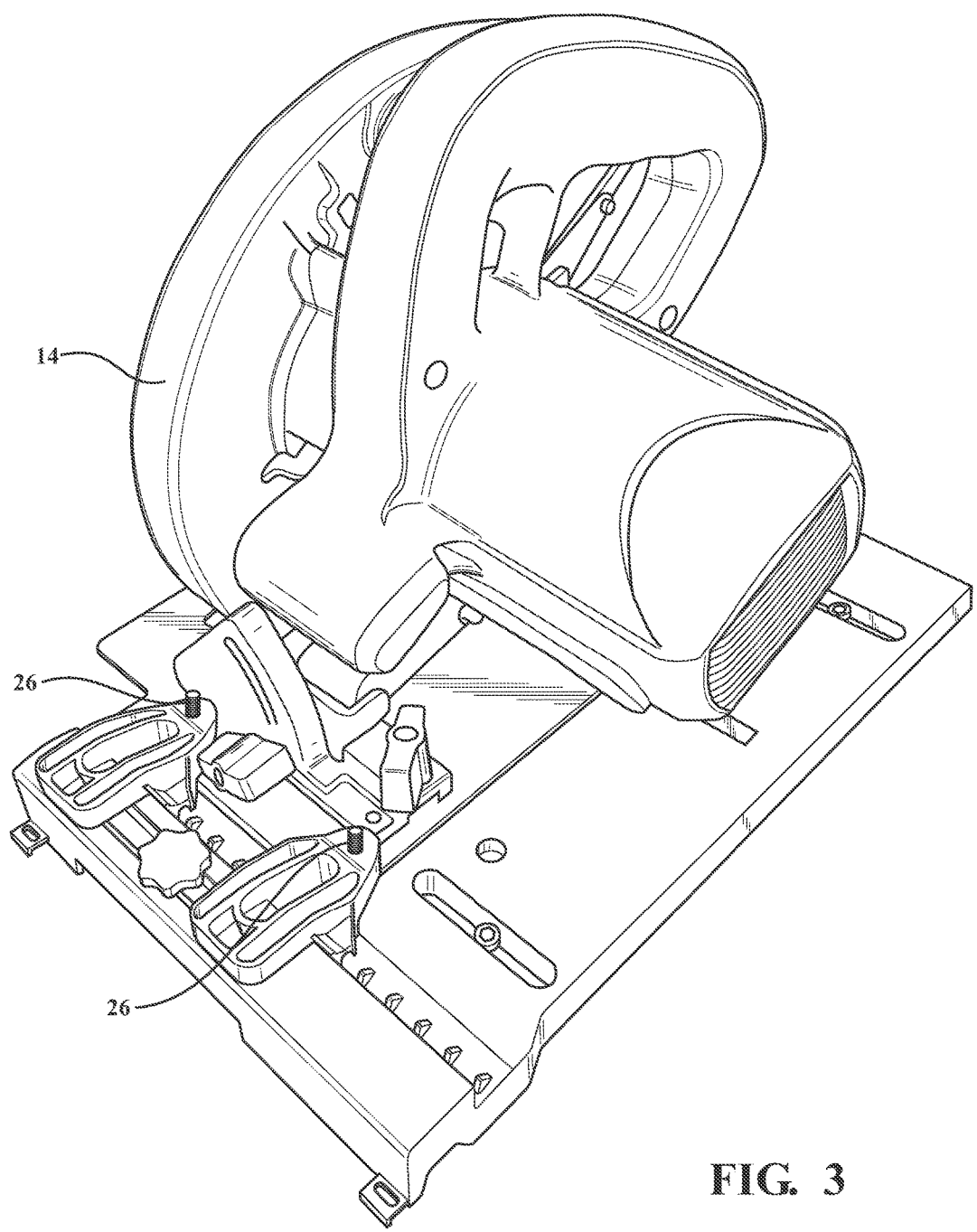
FIG. 3 is a perspective view of a circular saw mounted to the base plate of the present invention.

The cutting tool guide of the present invention is shown generally at 10 in FIG. 1. Guide 10 includes a base plate 12. In the disclosed embodiment, the plate is made of molded plastic, however, other materials such as for example aluminum or a combination of aluminum and plastic could be used. Base plate 12 is generally flat and adapted to receive for example a power or cutting tool 14, such as for example a circular saw, jig saw, reciprocating saw, router, etc., see FIG. 3 for an example of a circular saw mounted to the base 12. The base plate 12 includes three connectors at 16, 18 and 20. The connectors 16 and 18 are mounted within a slot 22 at the head 24 of the base plate 12. The connectors 16 and 18 have arms that extend into the track 22 which allow the connectors 16 and 18 to be mounted to the base 12 and to slide along the head 24. The connectors 16 and 18 of the disclosed embodiment have threaded mounts 26. The mounts 26 thread against the shoe of a power or cutting tool 14, such as for example a circular saw, as illustrated in FIG. 3. The connector 20 includes a threaded mount 28 and a bracket 30. The bracket 30 engages the shoe of the saw 14 and the threaded mount 28 can be adjusted down to hold the saw 14 onto the base plate 12. In the disclosed embodiment, the threaded mount 28 is a threaded stud and a wing nut.

Figure 4:
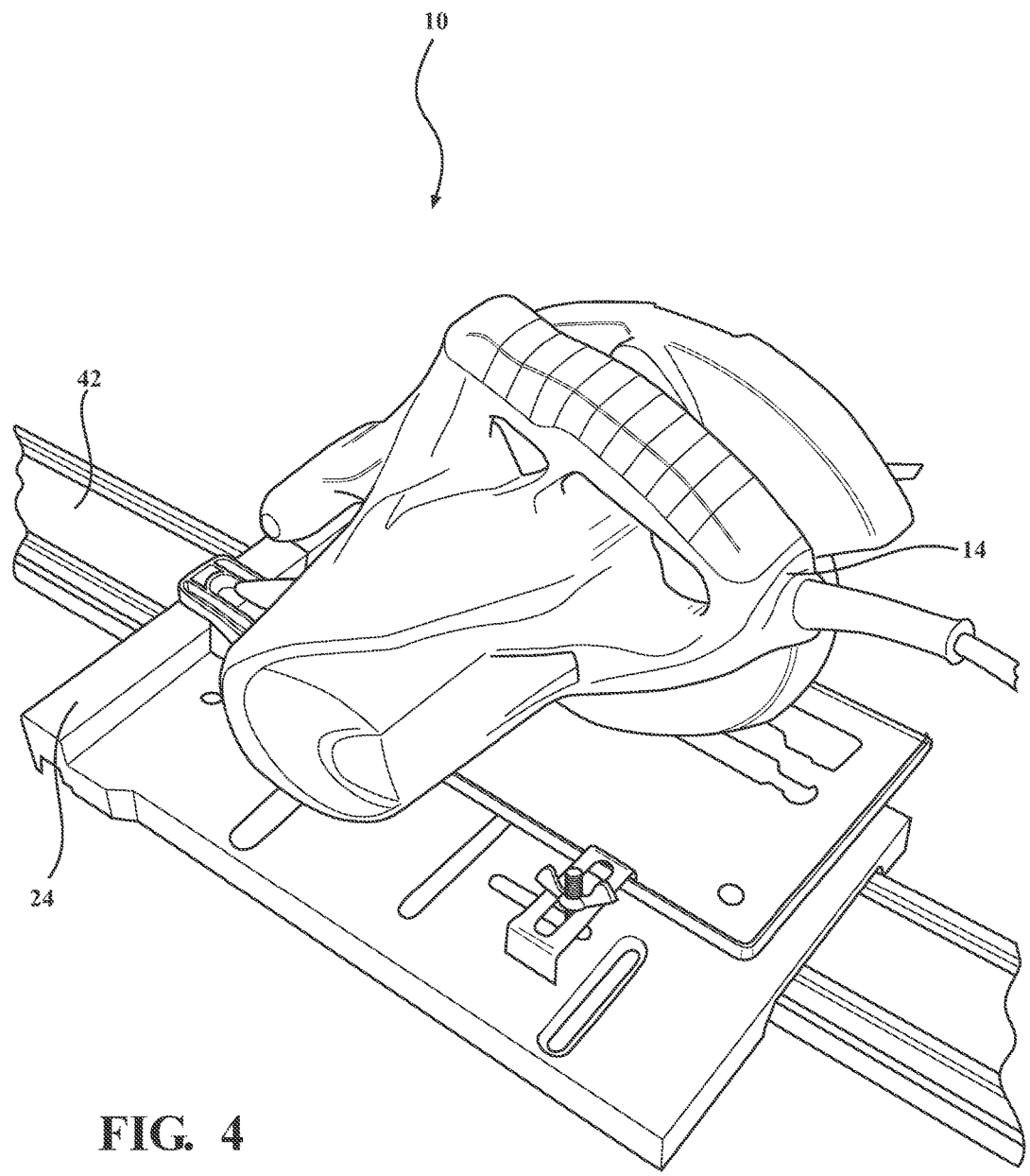
FIG. 4 is a perspective view of a circular saw mounted to the base plate of the present invention and positioned upon a straight edge for guided cutting.
Figure 5:
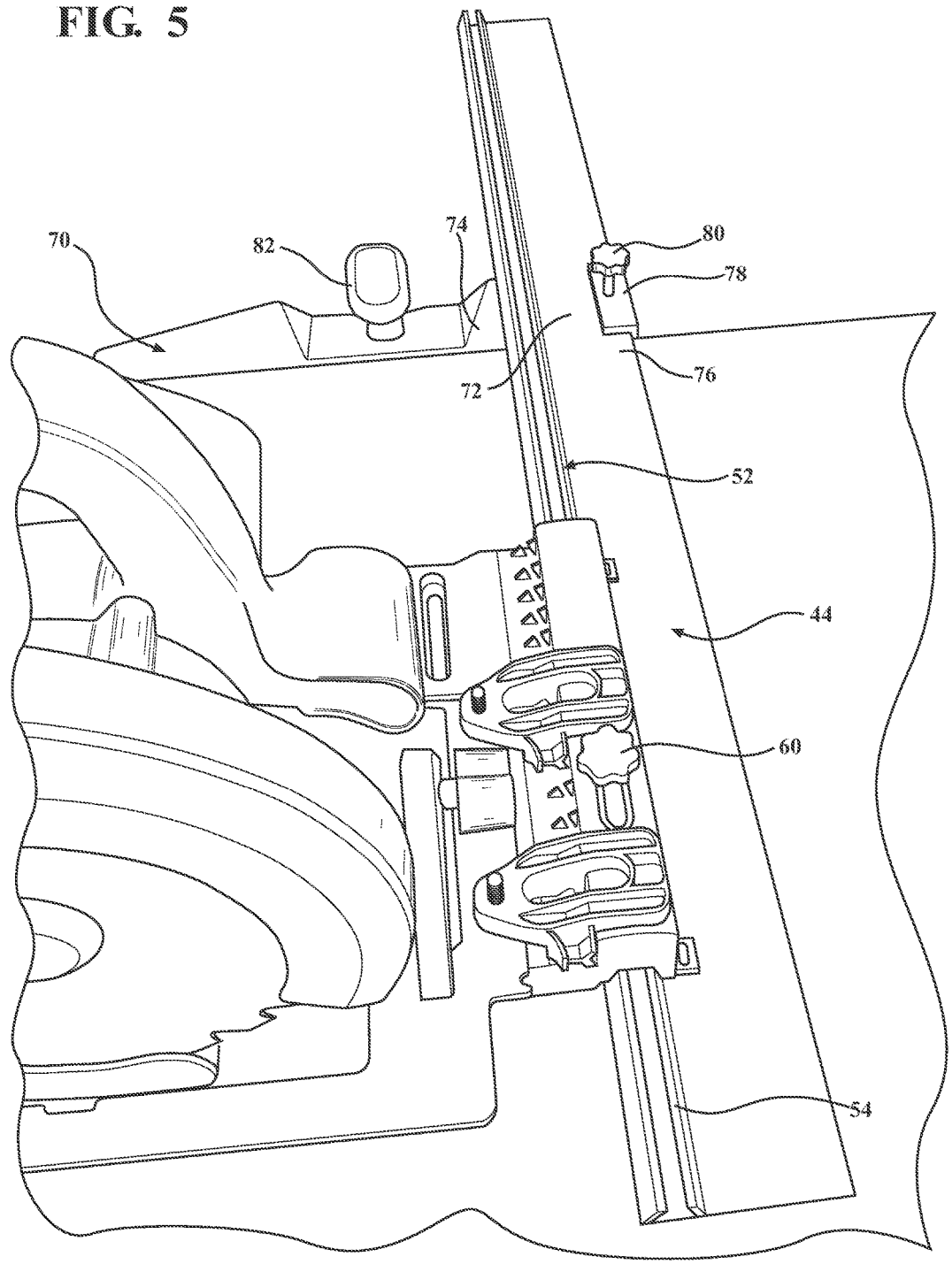
FIG. 5 is a partial perspective view of a saw mounted upon the base plate and mounted to the rip saw guide system of the present invention.

The bottom of the base plate 12 has a guide track that is defined by spaced walls 32 and 34. In the disclosed embodiment, one of the walls is a fixed guide wall 32 and the other wall is an adjustable guide wall 34. It should be appreciated that both walls could be adjustable. The adjustable guide wall includes arms 36 and an indicator 38. The arms 36 are retained with respect to the base plate 12 with fasteners 40. The wall 34 is adjusted to allow the walls 32 and 34 to engage a desired straight edge and allow the guide 10 to be moved along the straight edge. The adjustable wall 34 allows the guide 10 to be used on any desired straight edge, such as for example a four (4) inch board, a commercially available straight edge, etc. With reference to FIG. 4, the base plate 12 is illustrated on a straight edge 42. In the disclosed embodiment, the track is over four (4) inches wide and about one half, ½, inch deep, but as will be appreciated by those of ordinary skill in the art, could have a different size opening, either larger or smaller.

The base 12 also includes a pair of tabs 46 extending from the head portion 24. The tabs 46 are adapted to receive an indicator 48. The indicator 48 lines up with the blade of for example, the circular saw 14 to let the user know where the blade is located which simplifies the alignment of the straight edge.

In use, a cutting tool 14, such as a circular saw 14, is attached to the base 12. The connectors 16 and 18 are slid over the shoe of the cutting tool 14 and the connector 20 is positioned over the shoe and all connectors 16, 18 and 20 are tightened against the shoe. The blade of the tool 14 can be located using the indicator 48. A straight edge 42 is fixed to the work piece. The straight edge 42 for example, could be a piece of wood, a metal ruler, or a commercial straight edge, such as those supplied by applicant under the trademark BORA®. The base 12 is positioned over the straight edge 42 with the straight edge 42 being positioned within the track 22. The base 12 can be moved along the straight edge 42 to cut the work piece in a straight guided line.

The base 12 can also be used as a ripping saw with a rip straight edge 44. The disclosed base plate 12 has a lateral channel 50 that slides over the raised track 52 of the rip straight edge 44. In the disclosed embodiment, the lateral channel 50 and raised track 52 have generally mating angled sidewalls. The angled sidewalls mate to provide a more precise secure connection and provide a more tight connection when the base plate 12 is connected to the raised track 52. This ensures that the base plate 12 doesn't move with respect to the rip straight edge 44. The raised track has a groove 54 that is adapted to receive a locking wedge 56 that includes a locking member 58. The disclosed locking member 58 has a knob 60 and a threaded shaft 62 that is threading into the locking member 58.

It should be appreciated by those of ordinary skill in the art, that other methods could be used to connect the base plate 12 to the rip straight edge 44. For example, the rip straight edge 44 could be bolted or screwed to the base plate 12; or the base plate 12 could have a mating receiver that mates with the profile of the rip straight edge 44, etc. The key is that the base plate 12 be fixed to the rip straight edge 44.

The straight edge 44 also receives a rip guide 70. The rip guide 70 includes a guide way 72. The guide way 72 is defined by a raised wall 74 and a slot 76. The slot has a top surface 78 that extends over the edge of the straight edge 44. A locking member 80 is used to lock the rip guide 70 to the straight edge 44. In the disclosed embodiment, the locking member 80 is a threaded screw with a knob to facilitate the threading of the locking member against the straight edge 44. A handle 82 is provided on the straight edge 44 to facilitate movement of the saw 14 along the material to be ripped.

In use, the head 24 is positioned over the channel 50 with the wedge 56 inserted into the channel 50. The guide way 72 of the rip guide 70 is positioned over the straight edge 44 and the locking member 80 is threaded onto the straight edge 44 to lock the rip guide 70 onto the straight edge 44. The saw 14 is adjusted on the straight edge 44 to proper position to make the rip cut. Once positioned, the base 12 can be locked onto the straight edge 44 by engaging the locking member 80. The handle 82 can then be grasped and the saw moved along the work piece to rip a section from the material.

Figure 6:
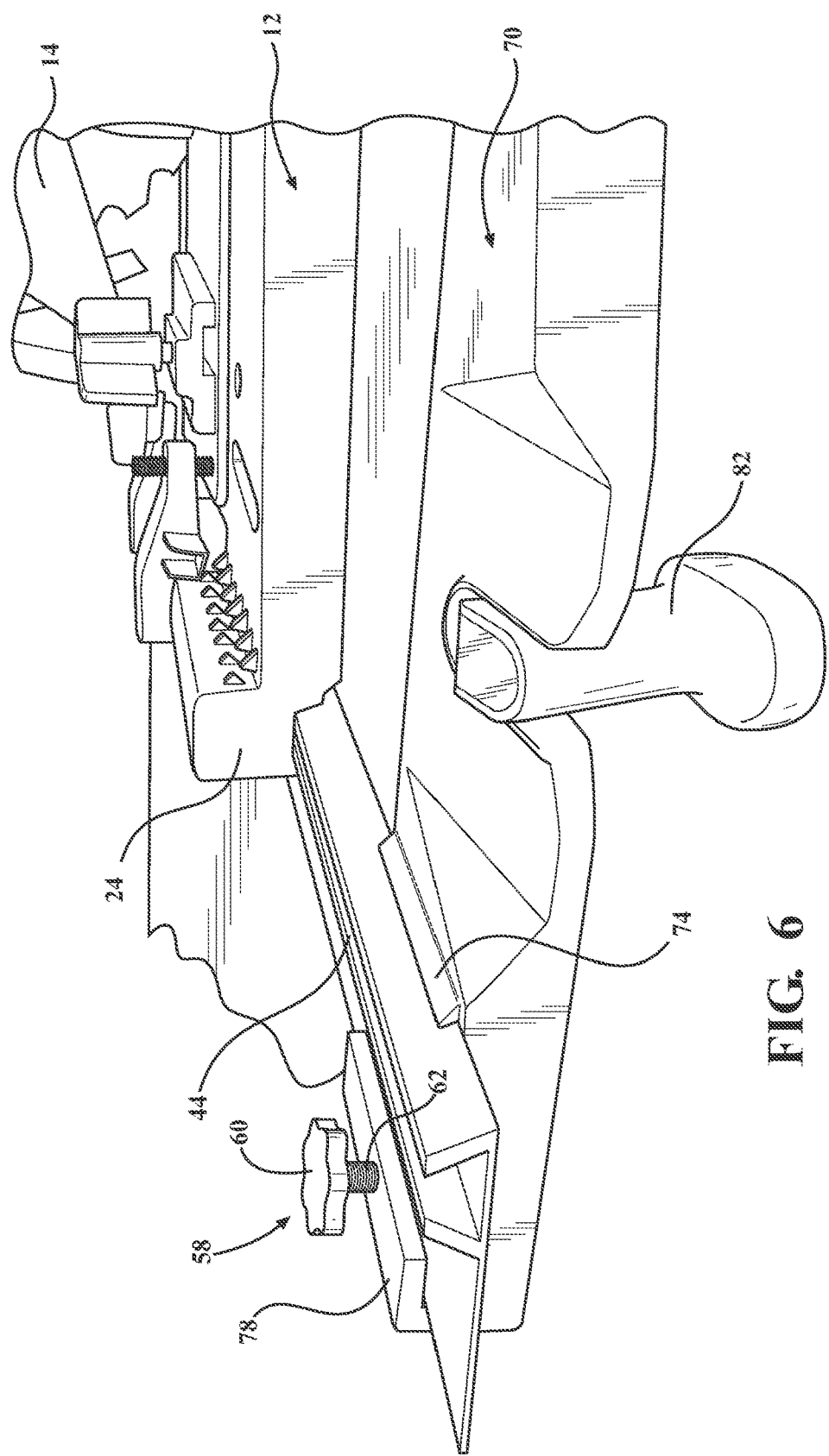
FIG. 6 is an end view of the rip saw guide of the present invention.
Figure 7:
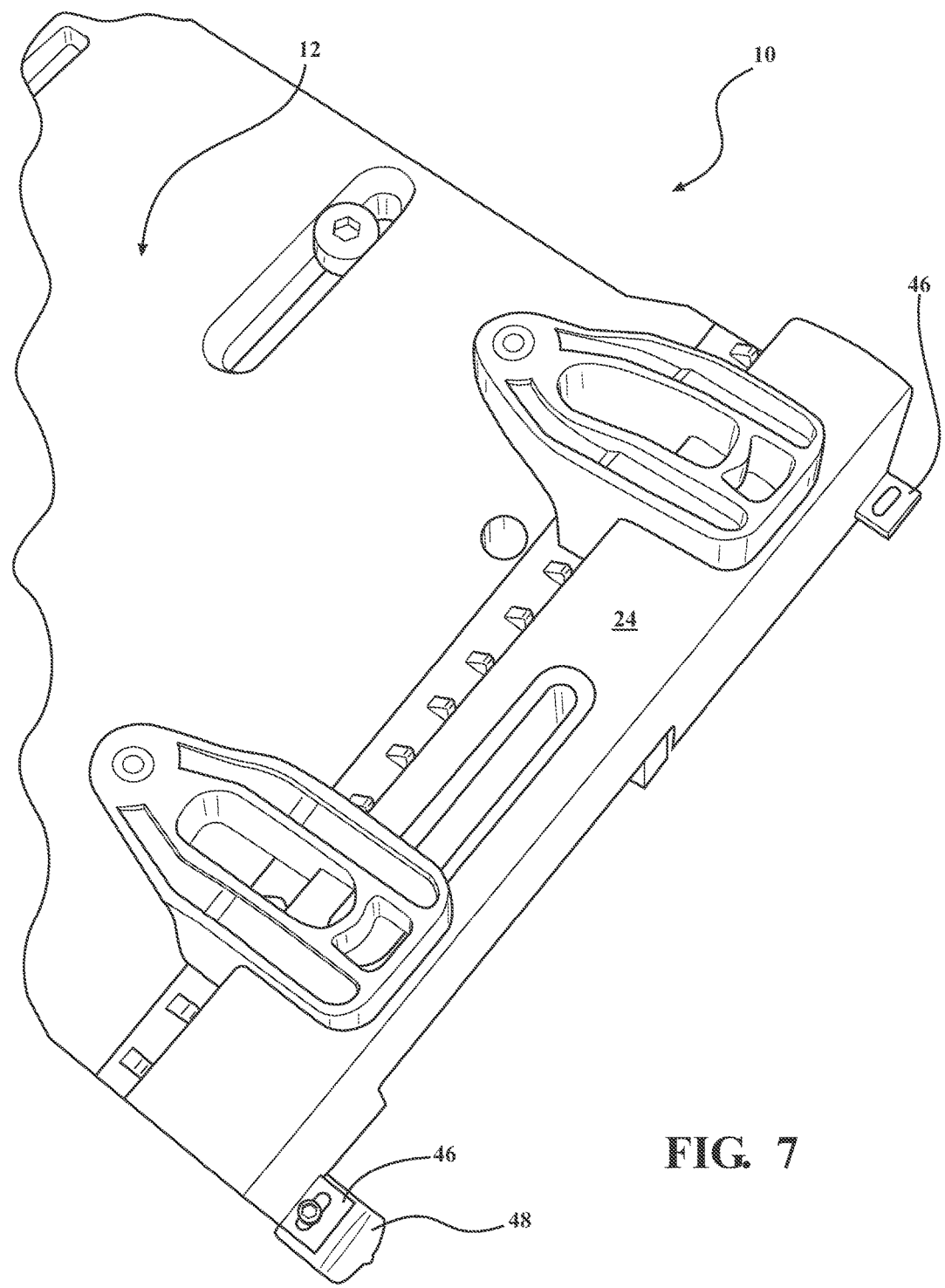
FIG. 7 is a partial top view of the base of the present invention.

As disclosed in FIG. 6, the handle 82 can be mounted to rotate with respect to the rip guide 70. Rotating the handle 82 allows the base 12 to be moved over the rip guide 70 to allow very narrow portions of the material to be ripped.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A cutting tool guide system comprising:
a base plate being unitary and having a top surface and a bottom surface, said top surface of said base plate top surface including connection points for connecting a power tool to said top surface of said base plate top surface;
said bottom surface having a first track extending longitudinally along said bottom surface of said base plate, said track being defined by first and second spaced walls protruding from said bottom surface of said base plate with at least one of said first and second spaced walls being movable with respect to said other first or second walls, said first track having a first axis extending along said first track;
said base plate defining a channel extending laterally along said bottom surface of said base plate, said channel having a second axis extending along said channel with said first axis intersecting said second axis at a right angle, said channel widening as it extends toward said bottom surface;
a rip straight edge having a second track with a groove extending along said second track and having a laterally extending rip guide whereby said rip straight edge engages said bottom surface of said base plate without touching said top surface of said base plate, said second track narrowing as it extends upward to said base plate bottom surface;

a locking member having a wedge engaged in said groove to pull said rip straight edge to said base plate, with said narrowing second track centering itself in said widening channel; and whereby the power tool is attached to said base plate and positioned upon a straight edge with said base plate being movable along the straight edge to make a straight cut in a piece of material wherein the straight edge and said channel interacts to guide the power tool, or the power tool is attached to said base plate and said channel of said base plate is mounted to a guide and make a straight cut in a piece of material using the material's edge to guide said base plate.

2. The cutting tool guide system of claim 1, wherein said movable wall includes an indicator to indicate the width of the track.

3. The cutting tool guide system of claim 1, further including three connection points.

4. The cutting tool guide system of claim 1, wherein at least one of said connection points can be moved to opposing sides of said base to accommodate either right or left handed power tools.

5. The cutting tool guide of claim 1, wherein said laterally extending rip guide includes a rotatable handle, said handle can be gripped by a user to facilitate rip cutting and can be rotated to avoid said base plate for cuts of small widths.

6. The cutting tool guide system of claim 1 wherein said locking member further includes an edge and a threaded shaft, said shaft being adapted to move said wedge into locking engagement.

7. The cutting tool guide system of claim 1 wherein said movable wall includes spaced arms extending from said movable wall, said spaced arms including locks to fix said movable arm with respect to said base plate.

8. The cutting tool guide system of claim 7 wherein said base plate has openings extending through said base plate and said locks extends through said openings into said arms to lock said arms to said base plate.

9. The cutting tool guide system of claim 1 further including at least two connection ports.

10. The cutting tool guide system of claim 9 wherein at least one of said connection points can be moved to opposing sides of said base plate to accommodate either right or left handed power tools.

* * * * *